US006894224B2

(12) United States Patent
Kobayashi et al.

(10) Patent No.: US 6,894,224 B2
(45) Date of Patent: May 17, 2005

(54) WATERPROOF PLUG FOR WATERPROOF CONNECTOR

(75) Inventors: Haruyo Kobayashi, Shizuoka (JP); Osamu Sugiyama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/308,013

(22) Filed: Dec. 3, 2002

(65) Prior Publication Data

US 2003/0146014 A1 Aug. 7, 2003

(30) Foreign Application Priority Data

Feb. 1, 2002 (JP) .................................... P2002-025621

(51) Int. Cl.[7] ............................................... H02G 15/02
(52) U.S. Cl. .................. 174/74 R; 174/74 A; 174/84 C
(58) Field of Search ............................ 174/74 R, 74 A, 174/75 F, 77 R, 84 R, 84 C; 439/877, 882

(56) References Cited

U.S. PATENT DOCUMENTS 4,643,506 A 2/1987 Kobler
4,828,507 A * 5/1989 Nagase et al. .............. 439/206
5,356,312 A * 10/1994 Abe et al. .................... 439/587
5,498,170 A * 3/1996 Tanaka ........................ 439/271
5,532,433 A * 7/1996 Endo et al. ............... 174/84 C
5,564,946 A * 10/1996 Kodama ...................... 439/587
6,250,972 B1 * 6/2001 Shinchi et al. .............. 439/752

FOREIGN PATENT DOCUMENTS

EP 0 844 693 A2 5/1998
JP 05-77858 A * 3/1993 ........... H01R/13/52
JP 07-335311 A * 12/1995 ........... H01R/13/52
JP 09-82401 A * 3/1997 ........... H01R/13/52
JP 09-092352 A * 4/1997 ............ H01R/4/18

* cited by examiner

*Primary Examiner*—William H. Mayo, III
(74) *Attorney, Agent, or Firm*—Sughrue Mion, PLLC

(57) ABSTRACT

A waterproof plug (10) for a waterproof connector includes a body (11) of a generally cylindrical shape. A wire (28) can be inserted into the body to be projected therefrom, and an outer peripheral surface (12) of the body can be press-contacted with an inner peripheral surface (23) of a cavity (22), while an inner peripheral surface (13) of the body can be press-contacted with the wire (28), and an insulation barrel (26) of a terminal (25) can compressively clamp the wire (28) through the body. An insertion hole (16) in the body is tapering such that a thickness t of a clamping portion (18) of the body is uniform along an axis thereof.

5 Claims, 3 Drawing Sheets

WATERPROOF PLUG FOR WATERPROOF CONNECTOR

BACKGROUND OF THE INVENTION

This invention relates to a waterproof plug for a waterproof connector, and more particularly to a waterproof plug of a waterproof connector which forms a waterproof seal between a cavity, formed in a housing of the waterproof connector, and a wire which is inserted in the cavity and connected to a terminal.

A waterproof plug for a waterproof connector is disclosed in JP-B-64-35675U. As shown in FIG. 5, this waterproof plug 60 includes a larger-diameter portion 61 of a generally cylindrical shape, and a smaller-diameter portion 65 of a generally cylindrical shape. Outer peripheral ribs 62 are formed on an outer peripheral surface of the larger-diameter portion 61 while inner peripheral ribs 63 are formed on an inner peripheral surface of the larger-diameter portion 61.

To mount this waterproof plug 60 on the waterproof connector, first, a wire 67 (shown in FIG. 6) is inserted into the waterproof plug 60 from the larger-diameter portion 61 toward the smaller-diameter portion 65. At this time, the inner peripheral ribs 63 on the larger-diameter portion 61 are press-contacted with an outer peripheral surface of the wire 67.

Then, the smaller-diameter portion 65, serving as a clamping portion, is compressively clamped by an insulation barrel 69 of a terminal 68, thereby connecting the waterproof plug 60 and the wire 67 to the terminal 68.

In this condition, the terminal 68 is inserted into a cavity 72 in a housing 70 in a direction of an arrow, and subsequently the waterproof plug 60 is press-fitted into the cavity 72. As a result, the outer peripheral ribs 62 on the larger-diameter portion 61 are press-contacted with an inner surface of the cavity 72 to form a hermetic seal, that is, a waterproof seal, therebetween.

However, the smaller-diameter portion 65 (serving as the clamping portion) of the waterproof plug 60, formed into a small size, has a reduced thickness, and therefore when the smaller-diameter portion 65 is compressively clamped by the insulation barrel 69 of the terminal 68, a distal end portion 66 of the smaller-diameter portion 65 is raised as shown in FIG. 6. The raised distal end portion 66 of the smaller-diameter portion 65 interferes with the inner peripheral surface of the cavity 72, and is turned up.

Among the waterproof connectors disclosed in JP-B-64-35675U, there is the one shown in FIG. 7. In this waterproof connector 80, an annular projection 81 is formed on an inner peripheral surface of a smaller-diameter portion 65 at a distal end thereof, so that the distal end portion 82 of the smaller-diameter portion 65 (serving as a clamping portion) has an increased thickness t1.

Therefore, when the smaller-diameter portion 65 is compressively clamped by the insulation barrel 69 of the terminal 68, the distal end portion 82 of the smaller-diameter portion 65 is prevented from being raised.

In this waterproof plug 80, however, the distal end portion 82 of the smaller-diameter portion 65 has the increased thickness t1, and therefore when the smaller-diameter portion 65 is compressively clamped by the insulation barrel 69 of the terminal 68, the distal end portion 82, having the thickness t1, is bulged. As a result, the bulged distal end portion 82 interferes with the inner peripheral surface of the cavity 72 (see FIG. 6), and is turned up.

SUMMARY OF THE INVENTION

This invention has been made in view of the above problems, and an object of the invention is to provide a waterproof plug for a waterproof connector in which when a clamping portion of the waterproof plug is compressively clamped by an insulation barrel of a terminal, a distal end portion of the clamping portion is prevented from being bulged.

In order to solve the aforesaid object, the invention is characterized by having the following arrangement.

(1) A waterproof plug for forming a waterproof seal between a cavity formed in a housing of a waterproof connector and a wire inserted in the cavity and connected to a terminal comprising:
  - a substantially cylindrical shape body into which the wire can be inserted, wherein an outer peripheral surface thereof can be press-contacted with an inner peripheral surface of the cavity, and an inner peripheral surface thereof can be press-contacted with the wire; and
  - a clamping portion for clamping the wire, wherein an inner diameter and an outer diameter thereof decrease toward an end portion thereof along an axis of the body,
  - wherein the wire is clamped by an insulation barrel of the terminal through the body.

(2) The waterproof plug according to (1), wherein the clamping portion has a substantially uniform thickness along the axis.

(3) The waterproof plug according to (1), a peripheral rib is formed on the outer peripheral surface of the clamping portion and is located so as to be covered with the insulating barrel.

(4) The waterproof plug according to (1), wherein
  - the clamping portion includes a first clamping portion and a second clamping portion, and
  - an inner diameter and an outer diameter of the second clamping portion are smaller than an inner diameter and an outer diameter of the first clamping portion, respectively.

DETAILED DESCRIPTION OF PREFERRED EMBODIMENTS

Figure 1:
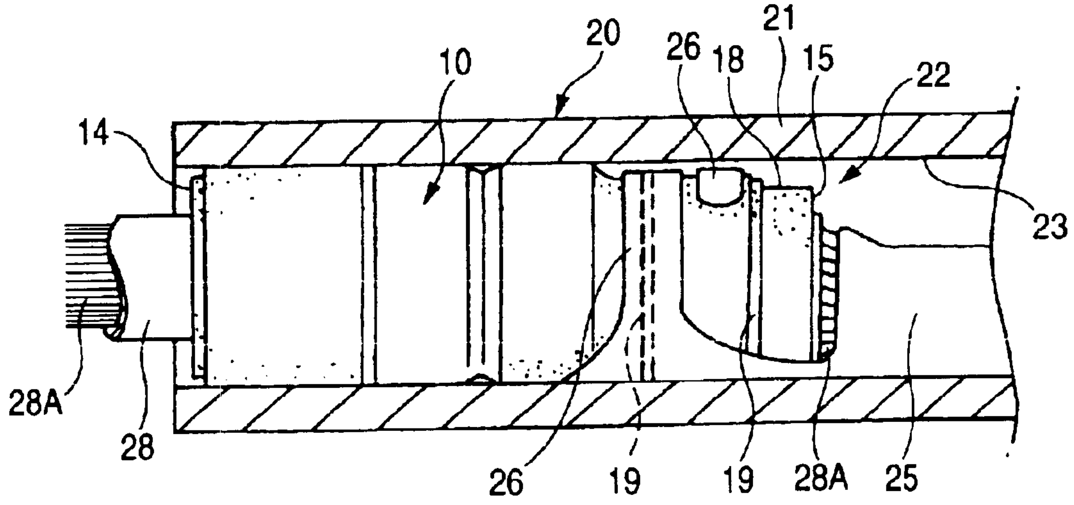
FIG. 1 is a side-elevational view showing a condition in which a waterproof plug of the invention for a waterproof connector is inserted in a cavity.

A preferred embodiment of the present invention will now be described in detail with reference to the drawings. In the embodiments described hereinafter, those members, already described with reference to FIG. 1, will be designated by identical or corresponding reference numerals, and explanation thereof will be made briefly or omitted.

First Embodiment

As shown in FIG. 1, a waterproof plug 10 for a waterproof connector according to the first embodiment of the invention is a member for forming a waterproof seal between a cylindrical cavity 22, formed in a housing 21 of the waterproof connector 20, and a wire 28 which is inserted in the cavity 22 and connected to a terminal 25.

Figure 2:
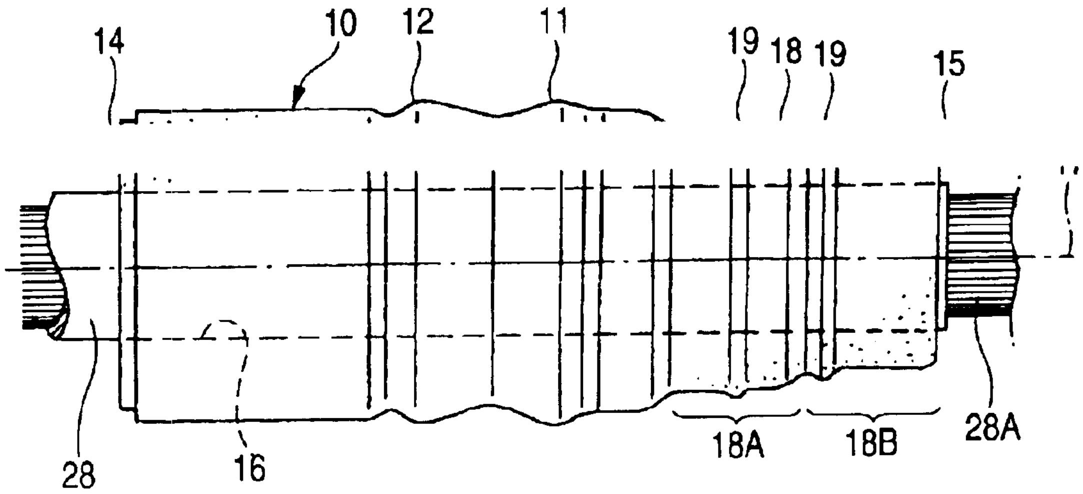
FIG. 2 is a side-elevational view showing a condition in which a wire is inserted in the waterproof plug of the invention for the waterproof connector.
Figure 3:
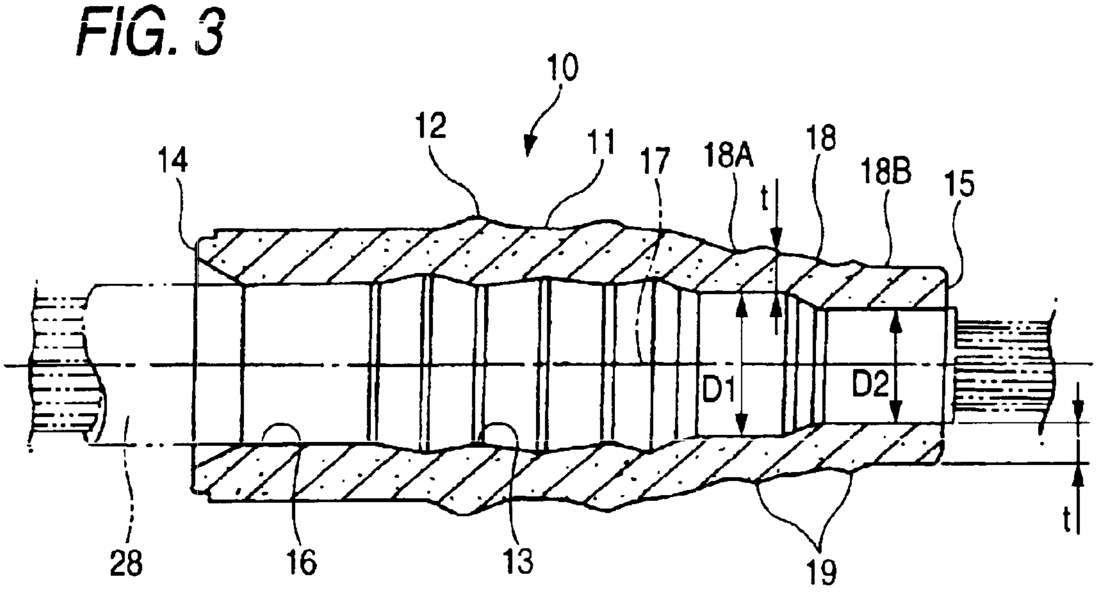
FIG. 3 is a cross-sectional view showing the waterproof pug of the invention for the waterproof connector.

As shown in FIG. 2, the waterproof plug 10 for the waterproof connector includes a body 11 of a generally cylindrical shape, and the wire 28 can be inserted into the body 11 and projected therefrom, an outer peripheral surface 12 which can be press-contacted with an inner peripheral surface 23 (see FIG. 1) of the cavity 22, and an inner peripheral surface 13 which can be press-contacted with the wire 28 as shown in FIG. 3. An insulation barrel 26 (see FIG. 1) of the terminal 25 can compressively clamp the wire 28 through a clamping portion 18 of the body 11.

An insertion hole 16 in the waterproof plug 10 of the waterproof connector is tapering from one end 14 thereof toward the other end portion 15 thereof such that the clamping portion 18 has a uniform thickness t along an axis 17.

Peripheral ribs 19 are formed on the outer peripheral surface of the clamping portion 18, and these ribs 19 are so disposed as to be covered with the insulation barrel 26 (see FIG. 1).

The clamping portion 18 includes a first clamping portion 18A and a second clamping portion 18B. An inner diameter D2 and an outer diameter of the second clamping portion 18B are smaller than an inner diameter D1 and an outer diameter of the first clamping portion 18A, respectively.

Next, the procedure of mounting the waterproof plug 10 on the waterproof connector 20 will be described.

First, the wire 28 is inserted into the insertion hole 16 in the waterproof plug 10 as shown in FIG. 2. The insertion hole 16 tapers toward the end portion 15 such that the clamping portion 18 of the waterproof plug 10 has the uniform thickness t along the axis 17, and therefore the clamp capacity for the wire 28 can be increased. Therefore, a gap between the wire 28 and the waterproof plug 10 is sealingly closed.

Figure 4:
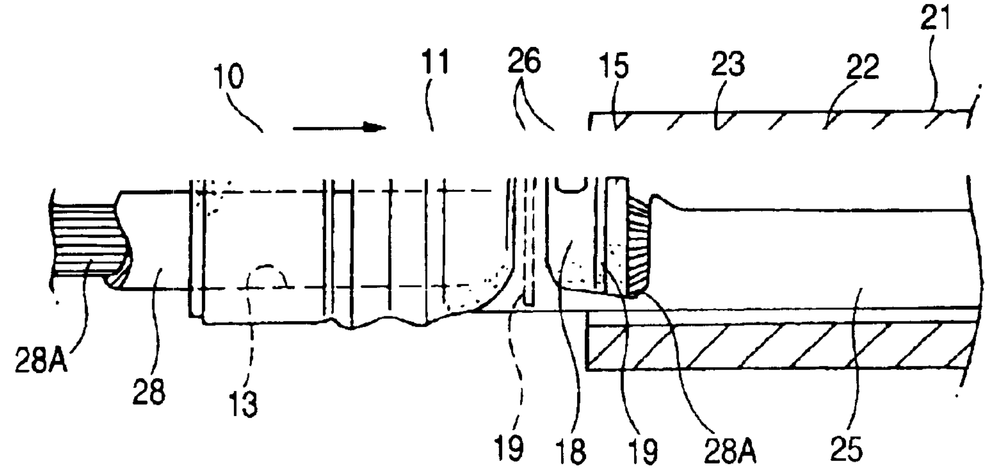
FIG. 4 is a view explanatory of an example in which the waterproof plug of the invention for the waterproof connector is to be inserted into the cavity.
Figure 5:
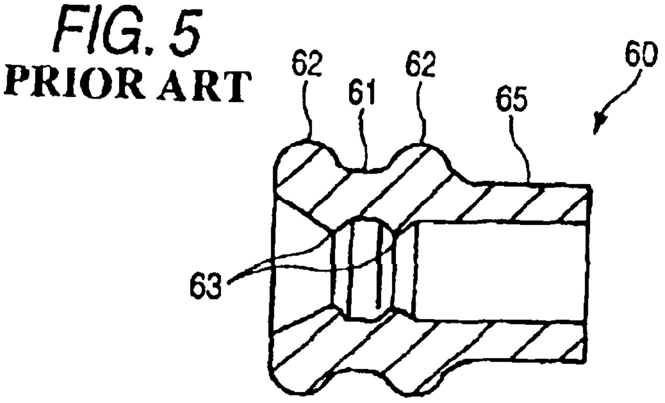
FIG. 5 PRIOR ART
FIG. 5 is a cross-sectional view of a conventional waterproof plug for a waterproof connector.
Figure 6:
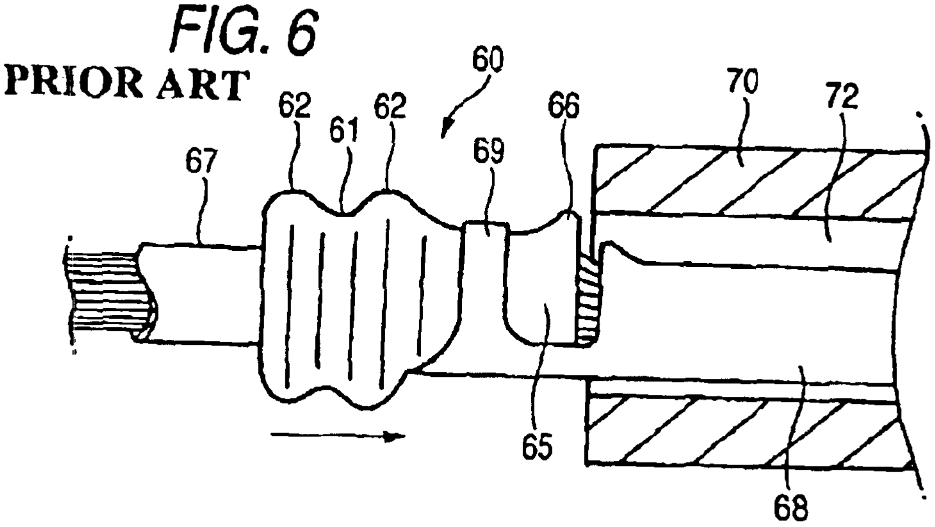
FIG. 6 PRIOR ART
FIG. 6 is a side-elevational view showing a condition in which the conventional waterproof plug for the waterproof connector is to be inserted into a cavity.
Figure 7:
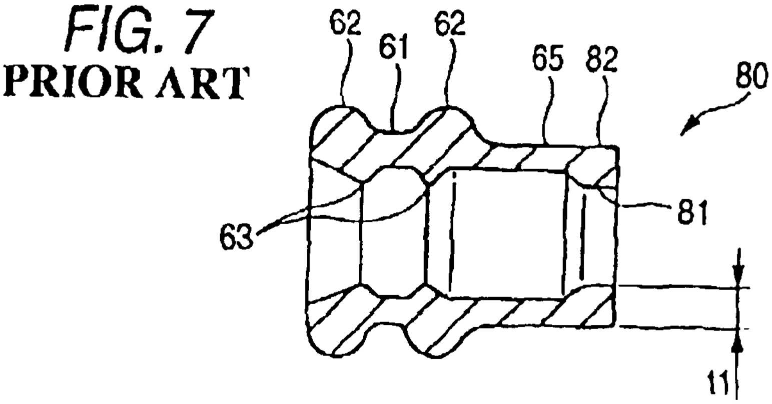
FIG. 7 PRIOR ART
FIG. 7 is a cross-sectional view showing another conventional waterproof plug for a waterproof connector.

Then, a conductor portion 28A of the wire 28 is connected to the terminal 25, and the clamping portion 18 is compressively clamped by the insulation barrel 26 of the terminal 25, thereby connecting the waterproof plug 10 and the wire 28 to the terminal 25, as shown in FIG. 4.

Since the insertion hole tapers toward the end portion 15, the outer diameter of the end portion 15 is decreasing gradually toward its distal end, and the thickness t (see FIG. 3) at the distal end portion 15 is made relatively large. With this construction, when the clamping portion 18 is compressively clamped by the insulation barrel 26, the end portion 15 is prevented from being raised.

Particularly, with respect to the clamping portion 18, the inner diameter of the second clamping portion 18B is smaller than the inner diameter of the first clamping portion 18A, and therefore the clamp capacity for the wire is further increased, and the raising of the clamping portion at the time of compressive clamping of the terminal can be positively prevented.

Particularly, with respect to the clamping portion 18, the outer diameter of the second clamping portion 18B is smaller than the outer diameter of the first clamping portion 18A, and therefore the bulge prevention effect is marked.

The ribs 19, formed respectively at the predetermined portions of the clamping portion 18, are covered with the insulation barrel 26, and therefore the insulation barrel 26 is held in intimate contact with the ribs 19, so that the insulation barrel-retaining ability is enhanced.

Then, the terminal 25 is inserted into the cavity 22, and subsequently the waterproof plug 10 is press-fitted into the cavity 22. At this time, the end portion 15 of the waterproof plug 10 will not be raised and bulged, and therefore the end portion 15 will not interfere with the cavity portion 22, and therefore is prevented from being turned up.

In the above embodiment, although the two ribs 19 are formed, the number of the ribs 19 is not limited to two, but can be three or more.

The present invention is not limited to the above embodiment, but suitable changes and improvements can be made, and the material, shape, dimensions, form, number, mounting position, thickness and etc., of each of the waterproof plug, the clamping portion, the ribs and so on, illustrated in the above embodiment, are arbitrary, and are not limited in so far as the present invention can be achieved.

As described above, in the present invention, the inner diameter and outer diameter of the clamping portion of the body are decreasing toward the end portion thereof along the axis of the body, and therefore the clamp capacity for the wire can be increased, and besides when the clamping portion is compressively clamped by the insulation barrel of the terminal, the end portion of the clamping portion is prevented from being raised, and also is prevented from being bulged.

Thus, the insertion end portion of the waterproof plug is prevented from being raised and bulged, and therefore when inserting the terminal into the cavity in the housing, the end portion of the waterproof plug will not interfere with the cavity portion, and therefore is prevented from being turned up. Therefore, the ability of inserting the terminal into the cavity is enhanced.

In the invention, the thickness of the clamping portion is generally uniform along the axis, and therefore the clamp capacity for the wire is increased, and the marked effect of preventing the raising of the end portion, as well as the marked effect of preventing the bulging thereof, can be obtained.

In the invention, the peripheral rib is formed on the outer peripheral surface of the clamping portion, and the rib is covered with the insulating barrel, and therefore the insulation barrel is held in intimate contact with the rib, so that the insulation barrel-retaining ability is enhanced.

In the invention, the inner diameter and outer diameter of the second clamping portion are smaller than the inner diameter and outer diameter of the first clamping portion, respectively. Therefore, the clamp capacity for the wire is increased, and besides the raising of the end portion at the time of clamping of the terminal is prevented, and the bulge prevention effect is marked.

What is claimed is:

1. A waterproof plug for forming a waterproof seal between a cavity formed in a housing of a waterproof connector and a wire inserted in the cavity and connected to a terminal comprising:

a substantially cylindrical shape body into which the wire can be inserted, wherein an outer peripheral surface of the substantially cylindrical shape body can be press-contacted with an inner peripheral surface of the cavity, and an inner peripheral surface of the substantially cylindrical shape body can be press-contacted with the wire; and a clamping portion for clamping the wire, wherein an inner diameter and an outer diameter of the clamping portion decrease toward an end portion of the clamping portion along an axis of the body such that the clamping portion includes a first clamping portion and a second clamping portion adjacent to the first clamping portion, wherein an inner diameter and an outer diameter of the second clamping portion are smaller than an inner diameter and an outer diameter of the first clamping portion, respectively, and the second clamping portion is provided at the end portion of the body;

wherein when the wire is clamped by an insulation barrel of the terminal through the body, the clamping portion is clamped by the insulation barrel.

2. The waterproof plug according to claim 1, wherein the clamping portion has a substantially uniform thickness along the axis.

3. The waterproof plug according to claim 1, a peripheral rib is formed on the outer peripheral surface of the clamping portion and is located so as to be covered with the insulation barrel.

4. The waterproof plug of claim 1, wherein only the first clamping portion is clamped by the insulation barrel.

5. The waterproof plug of claim 1, wherein the terminal has a connecting portion which connects the wire; and wherein the connecting portion is situated nearer to the second clamping portion than the first clamping portion.

* * * * *